T. ZIMMERMAN.
AUTOMOBILE STARTING, GENERATING, AND DISTRIBUTING APPARATUS.
APPLICATION FILED APR. 17, 1915.
1,252,529.
Patented Jan. 8, 1918.
3 SHEETS—SHEET 3.
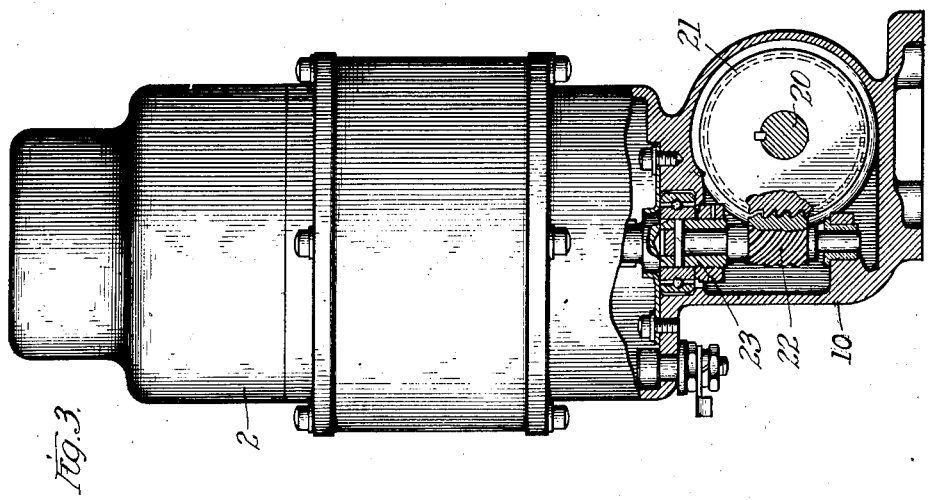
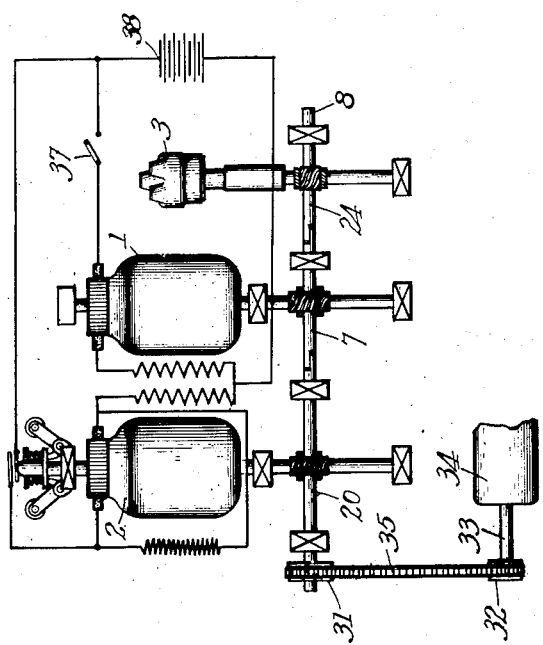
Witnesses:
Robert H. Weir
Jesse A. Holton
Inventor
Thomas Zimmerman
Raymund H. Van Nest
Atty.

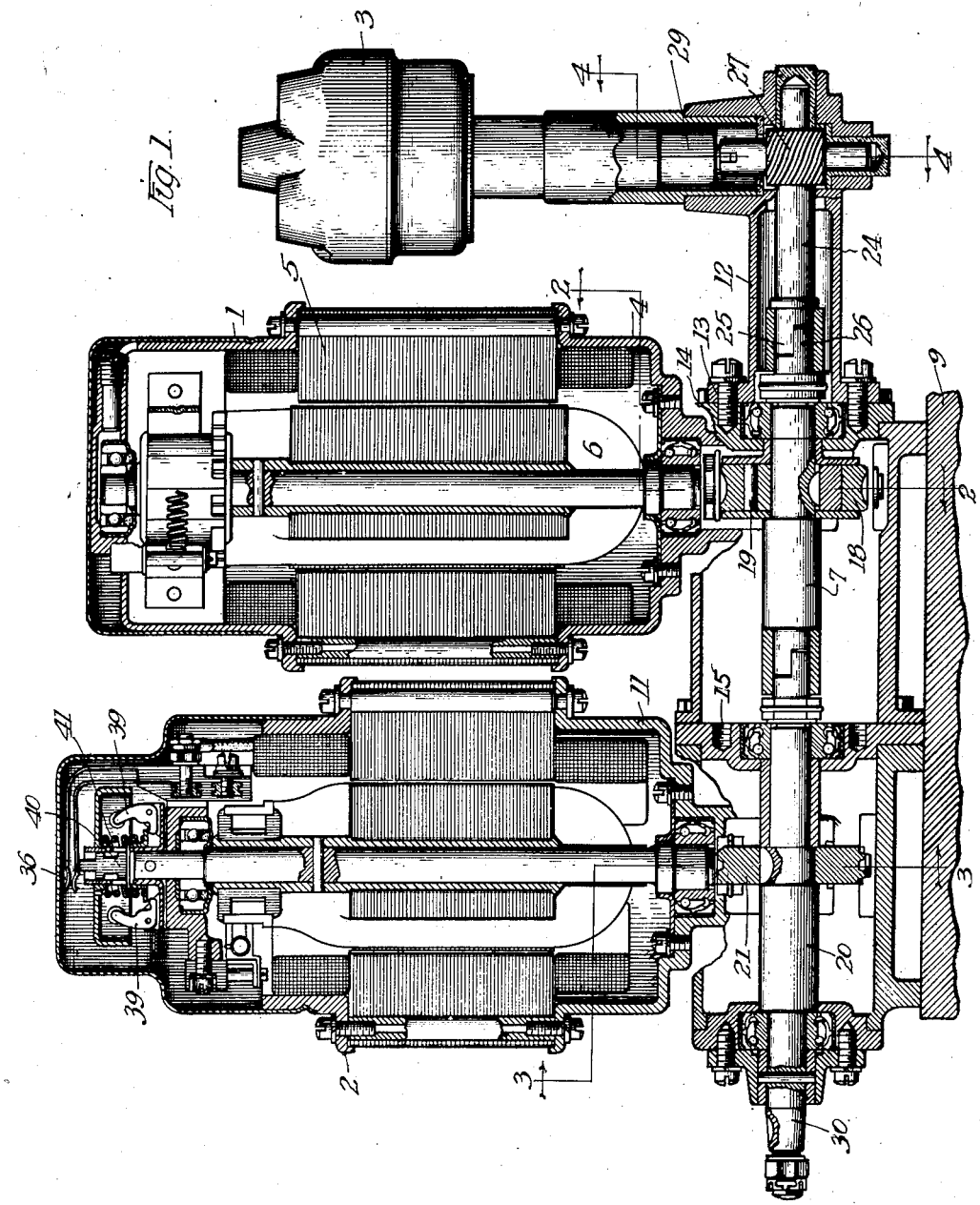

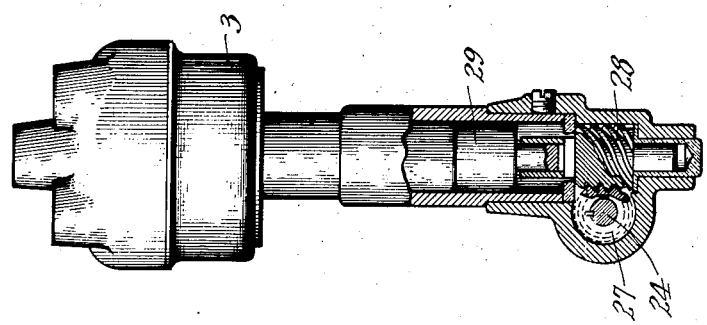
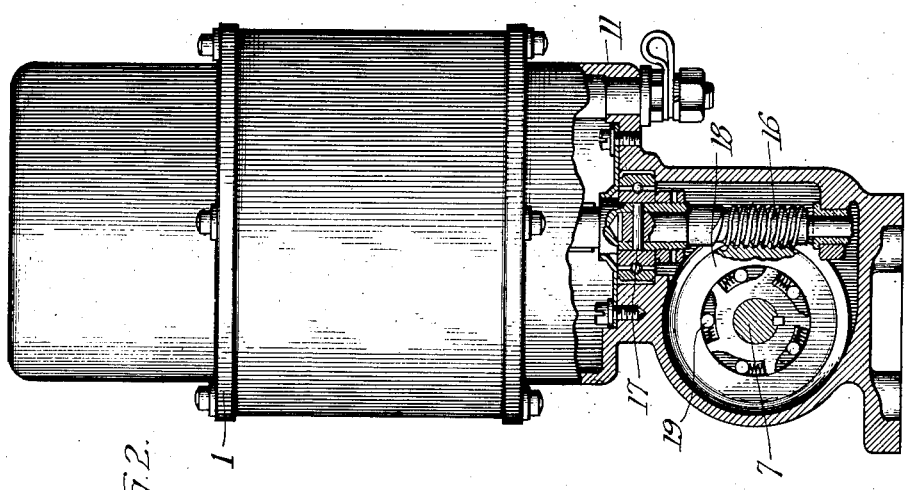

UNITED STATES PATENT OFFICE.

THOMAS ZIMMERMAN, OF NIAGARA FALLS, NEW YORK, ASSIGNOR TO U. S. LIGHT & HEAT CORPORATION, OF NIAGARA FALLS, NEW YORK, A CORPORATION OF NEW YORK.

AUTOMOBILE STARTING, GENERATING, AND DISTRIBUTING APPARATUS.

1,252,529.   Specification of Letters Patent.   Patented Jan. 8, 1918.

Application filed April 17, 1915. Serial No. 22,208.

*To all whom it may concern:*

Be it known that I, THOMAS ZIMMERMAN, a citizen of the United States, residing at Niagara Falls, in the county of Niagara and State of New York, have invented new and useful Improvements in Automobile Starting, Generating, and Distributing Apparatus, of which the following is a specification.

This invention relates to automobile starting, generating and distributing apparatus.

It is one of the objects of the invention to provide an apparatus of the above set forth character with a high degree of flexibility in the arrangement of parts permitting various possible combinations of units as may be required by the exigencies of different conditions.

Another object of the invention contemplates the provision of a simple, durable and extremely compact apparatus of the above said character.

Still another object is to provide a three unit system comprising a starting motor, a generator for recharging the storage battery and maintaining the lights and a distributer, the different units being easily detachable and capable of arrangement in different combinations by relatively unskilled operators.

Other objects will be in part obvious and in part pointed out hereinafter.

In the drawings, wherein is shown one of various possible embodiments of the invention—

Figure 1 is a view, partly in side elevation and largely in section, of a starting generator and distributing apparatus.

Fig. 2 is a view of the motor unit with parts of the transmission in section.

Fig. 3 is a view of the generator unit with parts of the transmission in section.

Fig. 4 is a view of the distributer unit with parts of the transmission in section.

Fig. 5 is a schematic view.

In Fig. 1 the motor unit is indicated generally at 1, the generator unit at 2 and the distributer unit at 3.

The motor unit comprises a housing 4 which supports a field yoke 5, the motor armature 6, and extends downwardly to support and incase a short shaft 7, which is one section of an attenuated sectional shaft indicated generally at 8. The housing 4 may be composed of separate parts as shown, or may be an integral structure. In the embodiment shown it will be noted that the housing below the field yoke comprises a one-piece casting which incloses the working parts of the transmission and which is provided with a base portion adapted to be bolted to a ledge 9 projecting from the engine casing or other suitable stationary part of the automobile. This casting is also provided on one side with suitable means for connecting the same to a similar casting 10 forming a part of the generator housing 11, and on the other side with suitable means for connecting the same to a casting 12, forming a part of the distributer unit 3. These castings are of such form that if desired, the motor unit may be removed from the system and the casting 12 of the distributer unit directly connected to the casting 10 of the generator unit. Bolt holes 13 in the casting 12 are adapted to aline either with the bolt holes 14 of the motor unit or with the bolt holes 15 of the casting 10 of the generator unit. On the lower end of the shaft of the motor armature 6 there is provided a small spiral gear 16, secured to said shaft in any suitable manner, as by the pin 17. This spiral gear meshes with a larger spiral gear 18, rotatably connected through the medium of an over-running clutch 19 to the section 7 of the shaft 8.

The casting 10 of the generator housing 11 is provided with a base similar to that of the motor unit and is adapted to be mounted upon the ledge 9, adjacent the base of the motor unit. This casting rotatably supports and incloses a section 20 of the shaft 8, and each of the sections 7 and 20 has an end formed to engage the adjacent end of the other. A spiral gear 21 is keyed upon the section 20 and engages with a spiral gear 22 fixed on the lower end of the generator shaft as by a pin 23.

In like manner the casting 12 of the distributer unit supports and incloses a section 24 of the shaft 8. This section has a split end 25 engaging with the split end 26 of the section 7, whereby rotation of one of said sections is imparted to the other. The section 24 has keyed thereon a spiral gear 27 which meshes with a spiral gear 28 pinned to the lower end of the distributer shaft 29.

It will be obvious from the foregoing that the three units are detachable; that the same may be assembled as shown in Fig. 1; that the distributer may be attached directly to the generator by removal of the motor; that the generator may be used independently and that the motor may be used independently by setting it up in the place of the generator and attaching a sprocket hub similar to the hub 30 formed on the section 20 of the shaft 8. The units, being separately removable, may of course be shipped separately and this brings about a highly desirable commercial condition, inasmuch as the car owner can be supplied with the different units for performing the different functions as the necessity arises, and furthermore, inasmuch as if at any time he desires to eliminate any part of the system, he can do so readily without the assistance of skilled workmen.

It is to be noted that the shaft 8 is arranged horizontally and parallel to the axis of the crank shaft of the engine and that the unit shafts are vertically arranged, thereby reducing the friction and providing a device conveniently adaptable to the available space in present day automobile construction. The three units are arranged in proximity, thereby centralizing the working parts of the system and bringing them under the more convenient control of the operator.

A sprocket 31 is keyed, or otherwise suitably secured, on the section 20 of the shaft 8 and connected to a sprocket 32 keyed upon the crank shaft 33 of an internal combustion engine indicated at 34, by means of a sprocket chain 35.

Suitable anti-friction bearings are provided where desirable, both for the sectional shaft 8 and for the unit shafts.

A speed controlled switch is indicated at 36 and is closed or opened accordingly as the speed of the engine increases to a pre-determined point or falls below such point. By this switch the generating circuit is automatically controlled.

In the operation of this system, assuming the three units to be assembled, a starting switch 37 is actuated to close an electrical circuit including the starting motor and a storage battery 38. The spiral gear 16 on the motor shaft is rotated and transmits power through a spiral gear 18 to rotate the section 7 and the then connected sections 24 and 20 of the shaft 8, or, in other words, to rotate the entire shaft 8. Power is thereby transmitted from the shaft 8 through the chain and sprocket connections described, to the crank shaft of the engine and compression and ignition take place in the engine and the latter proceeds to operate under its own power. The action of the engine accelerates the speed of the shaft 8 and the over-running clutch 19 interrupts the power transmission between the engine and the motor shaft. At this time the starting switch 70 may be opened and the motor will remain idle. However, through the spiral gears 21 and 22 power is transmitted to the generator which speeds up until its centrifugal force causes the bell crank levers 39 to act on the switch closer 40 and urge the same against the action of the spring 41 to bridge the contacts of switch 36. A generating circuit is thereby established and current may be supplied to the lamps and to the battery. Simultaneously, the distributer 3 is operated through the medium of the connecting spiral gears 27 and 28.

As many changes could be made in the above construction and many apparently widely different embodiments of this invention could be made without departing from the scope thereof, it is intended that all matter contained herein, or shown in the accompanying drawings, shall be interpreted as illustrated and not in a limiting sense.

What I claim as new, and desire to secure by Letters Patent, is:

1. In apparatus of the character described, in combination, a motor unit, a generator unit, a distributer unit, and means whereby the said units may be assembled to coöperate with a power transmission common to all or disassembled and arranged in different operative combinations of one, two or three units.

2. In apparatus of the character described, in combination, a generator unit, a distributer unit, means whereby said units may be connected adjacent each other to a common transmission device, a motor unit, and means whereby the latter may be arranged and operatively connected between the generator and the distributer.

3. In apparatus of the character described, in combination, an internal combustion engine, a starting, generating and distributing system comprising a plurality of detachable units, power transmitting parts connecting the engine with one of said units, and means whereby the units may be arranged to obtain starting and generating only, generating and distributing only, or starting, generating and distributing.

4. In apparatus of the character described, in combination, an internal combustion engine, a starting, generating and distributing system comprising a plurality of detachable units, power transmitting parts connecting the engine with one of said units, and means whereby the units may be arranged to obtain generating only, starting and generating only, generating and distributing only, or starting, generating and distributing.

5. In apparatus of the character described, in combination, a starting motor having its armature shaft vertically disposed, a generator having its armature shaft vertically disposed, an internal combustion engine having its crank shaft rotatable about a horizontal axis, and means comprising a shaft rotatable about a horizontal axis, whereby power is transmitted between the motor and generator and the engine.

6. In apparatus of the character described, in combination, a shaft, a starting motor, a generator, a distributer, means independently connecting said motor, generator and distributer with said shaft, and means adapted to transmit power between said shaft and the crank shaft of an engine.

7. In apparatus of the character described, in combination, a shaft, a starting motor, a generator, a distributer, means operatively connecting said motor, generator and distributer with said shaft, and means adapted to transmit power between said shaft and the crank shaft of an engine, said shaft being detachable in sections in order to permit certain of the units to be removed or interchanged.

8. In apparatus of the character described, in combination, a starting motor, a generator and a distributer having respectively a motor shaft, generator shaft and distributer shaft all vertically disposed, a horizontally disposed sectional shaft, gears mounted on said sectional shaft, and gears mounted on said other shafts respectively meshing with the first said gears, whereby power is transmitted between the vertical shafts and the horizontal shaft.

9. In apparatus of the character described, in combination, a starting motor, a generator and a distributer having respectively a motor shaft, generator shaft and distributer shaft all vertically disposed, a horizontally disposed sectional shaft, spiral gears mounted on said sectional shaft, and spiral gears mounted on said other shafts respectively meshing with the first said gears, whereby power is transmitted between the vertical shafts and the horizontal shaft.

10. In apparatus of the character described, in combination, a starting motor, a generator and a distributer having respectively a motor shaft, generator shaft and distributer shaft all vertically disposed, a horizontally disposed sectional shaft, gears mounted on said sectional shaft, gears mounted on said other shafts respectively meshing with the first said gears, whereby power is transmitted between the vertical shafts and the horizontal shaft, and means whereby the transmission of power between the motor shaft and the sectional shaft may be automatically interrupted.

11. In apparatus of the character described, in combination, a starting motor, a generator and a distributer having respectively a motor shaft, generator shaft and distributer shaft, a sectional shaft, gears mounted on said sectional shaft, gears mounted on said other shafts respectively meshing with the first said gears, whereby power is transmitted between the motor, generator and distributer shafts and the sectional shaft, and a housing comprising a plurality of assembled detachable sections adapted to confine said sectional shaft and said gears.

12. In apparatus of the character described, in combination, a starting motor, a generator and a distributer having respectively a motor shaft, generator shaft and distributer shaft all vertically disposed, a horizontally disposed sectional shaft, spiral gears mounted on said sectional shaft, spiral gears mounted on said other shafts respectively meshing with the first said gears, whereby power is transmitted between the vertical shafts and the horizontal shaft, and a housing comprising a plurality of assembled detachable sections adapted to confine said sectional shaft and said gears.

13. In apparatus of the character described, in combination, a starting motor, a generator and a distributer having respectively a motor shaft, generator shaft and distributer shaft all vertically disposed, a horizontally disposed sectional shaft, gears mounted on said sectional shaft, gears mounted on said other shafts respectively meshing with the first said gears, whereby power is transmitted between the vertical shafts and the horizontal shaft, means whereby the transmission of power between the motor shaft and the sectional shaft may be automatically interrupted, and a housing comprising a plurality of assembled detachable sections adapted to confine said sectional shaft and said gears.

14. In apparatus of the character described, in combination, a unit comprising a short shaft, a motor having an armature shaft extending transversely of said short shaft and power transmitting connections between the shafts, another unit comprising a short shaft, a generator having an armature shaft extending transversely of the second said short shaft and power transmitting connections between the shafts of the second unit, and means detachably connecting the two units.

15. In apparatus of the character described, in combination, a unit comprising a short shaft, a motor having an armature shaft extending transversely of said short shaft and power transmitting connections between the shafts, another unit comprising a short shaft, a generator having an armature shaft extending transversely of the second said short shaft and power transmitting connections between the shafts of the second unit, means detachably connecting the two units, a third unit comprising a short shaft, a distributer having a shaft extending transversely of the short shaft of the third unit and power transmitting connections between the said shafts of the third unit, and means detachably connecting the third unit with the first said unit.

16. In apparatus of the character described, in combination, a unit comprising a short shaft, a motor having an armature shaft extending transversely of said short shaft and power transmitting connections between the shafts, another unit comprising a short shaft, a generator having an armature shaft extending transversely of the second said short shaft and power transmitting connections between the shafts of the second unit, means detachably connecting the two units, a third unit comprising a short shaft, a distributer having a shaft extending transversely of the short shaft of the third unit and power transmitting connections between the said shafts of the third unit, and means whereby the third unit may be detachably secured to the first unit or to the second unit, as desired.

In witness whereof, I have hereunto subscribed my name.

THOMAS ZIMMERMAN.